(12) United States Patent
Wilhelmsson et al.

(10) Patent No.: US 11,936,509 B2
(45) Date of Patent: Mar. 19, 2024

(54) DUAL-MODULATION TRANSMISSION IN A WIRELESS COMMUNICATION SYSTEM

(71) Applicant: Telefonaktiebolaget LM Ericsson (publ), Stockholm (SE)

(72) Inventors: Leif Wilhelmsson, Lund (SE); Henrik Sjöland, Lund (SE); Miguel Lopez, Solna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 17/423,660

(22) PCT Filed: Jan. 25, 2019

(86) PCT No.: PCT/EP2019/051908
§ 371 (c)(1),
(2) Date: Jul. 16, 2021

(87) PCT Pub. No.: WO2020/151836
PCT Pub. Date: Jul. 30, 2020

(65) Prior Publication Data
US 2022/0078068 A1    Mar. 10, 2022

(51) Int. Cl.
*H04L 27/32* (2006.01)
*H04L 27/00* (2006.01)
(Continued)

(52) U.S. Cl.
CPC ......... *H04L 27/32* (2013.01); *H04L 27/0008* (2013.01); *H04L 27/04* (2013.01); *H04L 27/10* (2013.01)

(58) Field of Classification Search
CPC ..... H04L 27/0008; H04L 27/32; H04L 27/04; H04L 27/12; H04L 27/02; H04L 27/10; H04W 52/02
See application file for complete search history.

(56) References Cited

U.S. PATENT DOCUMENTS 6,434,194 B1    8/2002 Eisenberg et al.
7,826,552 B2 *  11/2010 Kobayashi .......... H04L 27/0008
375/295

(Continued)

FOREIGN PATENT DOCUMENTS

CN    107017953 A    8/2017
CN    108173961 A    6/2018
(Continued)

OTHER PUBLICATIONS

International Search Report and Written Opinion dated Sep. 23, 2019 for International Application No. PCT/EP2019/051908 filed on Jan. 25, 2019, consisting of 11 pages.
(Continued)

*Primary Examiner* — Betsy Deppe
(74) *Attorney, Agent, or Firm* — Christopher & Weisberg, P.A.

(57) ABSTRACT

A transmitter and method therein for transmitting a signal to a receiver in a wireless communication system are disclosed. The transmitter is configured to modulate a signal using two different modulations, a combination of binary amplitude shift keying, ASK, and binary frequency shift keying, FSK, and transmit the modulated signal.

19 Claims, 9 Drawing Sheets

(51) Int. Cl.
*H04L 27/04* (2006.01)
*H04L 27/10* (2006.01)

(56) References Cited

U.S. PATENT DOCUMENTS

| | | | | |
|---|---|---|---|---|
| 9,079,041 | B2 * | 7/2015 | Park | ......................... H04L 27/02 |
| 9,800,441 | B2 * | 10/2017 | Siligaris | .................. H04L 27/04 |
| 2007/0036237 | A1 | 2/2007 | Kobayashi et al. | |
| 2007/0253468 | A1 * | 11/2007 | Pettersen | ............. H04B 1/0483 |
| | | | | 375/E1.001 |
| 2009/0147837 | A1 | 6/2009 | Lau | |
| 2016/0301552 | A1 | 10/2016 | Siligaris et al. | |
| 2018/0038951 | A1 | 2/2018 | Stayton | |

FOREIGN PATENT DOCUMENTS

| | | | |
|---|---|---|---|
| CN | 108682130 | A | 10/2018 |
| JP | 03062750 | A | 3/1991 |
| JP | 07294617 | A | 11/1995 |
| JP | 08181632 | A | 7/1996 |
| JP | 2006186882 | A | 7/2006 |
| JP | 2006521036 | A | 9/2006 |
| JP | 2007151077 | A | 6/2007 |
| JP | 2008016952 | A | 1/2008 |
| JP | 2008227686 | A | 9/2008 |
| JP | 2014136527 | A | 7/2014 |

OTHER PUBLICATIONS

Yang, Liu, et al., Realization of FSK/ASK modulation format based on a dual-parallel modulator, CrossMark Opt Quant Electron, Jan. 9, 2017, Springer Science+Business Media, LLC, Wuhan, China, consisting of 11 pages.
Japanese Office Action and English Summary dated Oct. 4, 2022 for Application No. 2021-541597, consisting of 22 pages.
Japanese Decision of Rejection and English translation dated Apr. 4, 2023 for Application No. 2021-541597, consisting of 7 pages.
Chinese Office Action and English Translation Sep. 6, 2023 for Application No. 201980089936.7, consisting of 12 pages.

* cited by examiner

DUAL-MODULATION TRANSMISSION IN A WIRELESS COMMUNICATION SYSTEM

CROSS-REFERENCE TO RELATED APPLICATIONS

This application is a Submission Under 35 U.S.C. § 371 for U.S. National Stage Patent Application of International Application Number: PCT/EP2019/051908, filed Jan. 25, 2019 entitled "DUAL-MODULATION TRANSMISSION IN A WIRELESS COMMUNICATION SYSTEM," the entirety of which is incorporated herein by reference.

TECHNICAL FIELD

Embodiments herein relate to a transmitter and method therein for transmitting a signal to a receiver in a wireless communication system. In particular, the embodiments herein relate to transmitting a signal modulated with two different modulations.

BACKGROUND

Internet of Things (IoT) is expected to increase the number of connected devices significantly. A vast majority of these devices will likely operate in unlicensed bands, in particular in 2.4 GHz Industrial, Scientific and Medical (ISM) band. At the same time, there is also increased demand for using the unlicensed bands also for services that traditionally have been supported in licensed bands. For example, the third generation partnership project (3GPP) that traditionally develops specifications only for licensed bands has now also developed versions of Long Term Evolution (LTE) which will operate in 5 GHz unlicensed band.

A large number of these IoT devices are expected to be powered by coin-cell batteries, which means that energy consumption is of outmost importance. In the future, it may even be so that these devices will be able to harvest their energy themselves, potentially even further increasing the importance of low energy consumption.

For these kinds of applications, data rates are low, both concerning peak data rate and aggregated data rate during e.g. an average day. This means that the major part of the power is not consumed when the IoT device is transmitting or receiving data, but rather when the IoT device is listening to determine whether there might be a transmission intended for it.

The fact that such a large part of the total energy consumption is due to listening for a potential transmission, just to find out that a transmission intended for it is not there, has motived a development of so-called wake-up receivers (WUR). A WUR is a circuit which has extremely low power consumption and whose only purpose is to wake up a main transceiver in e.g. an IoT device. So, an IoT device with a WUR will not need to turn on its main receiver to scan for a potential packet transmission, but will instead turn on the WUR. If in fact there is data for the IoT device, a wake-up signature (WUS) will be sent to the WUR. When the WUR has decoded this WUS and determined that there in fact is data present, it will then wake up the main receiver and transmitter, and a communication link can be established.

Because the WUR should be extremely power efficient, spectrum efficient modulation formats like Quadrature Amplitude Modulation with M symbols (M-QAM) are not feasible. Instead the modulations that presently are considered as feasible alternatives are on-off-keying (OOK) and frequency shift keying (FSK). OOK is the modulation selected for the IEEE 802.11ba standard, which is the only standard that has considered supporting WUR up until now. However, FSK has been considered in numerous papers and also has some implementation advantages.

Since an OOK signal is a signal modulated only in amplitude and not in frequency its detection is almost independent of frequency accuracy and phase noise. This means that a receiver may employ a frequency down-conversion with a free-running oscillator whose frequency is not locked, so that intermediate frequency (IF) becomes uncertain. A simple analog amplitude detector may be used to demodulate an OOK signal at the uncertain IF. The amplitude detector is to be surrounded by filters, one on the input side to let through the signals within IF frequency range in which the desired signal may reside, and one at the output to attenuate amplitude variations of the signal with higher frequencies than those corresponding to the OOK. The filter at the output is also beneficial to suppress the lowest frequencies to get rid of DC-offset and low frequency disturbances. Although simple, however, a disadvantage of the analog amplitude detector is that it has a diminishing gain at low input signal levels, limiting sensitivity of the receiver.

In contrast to OOK, a FSK signal is a signal modulated only in phase or frequency and not in amplitude. The demodulation is therefore less sensitive to disturbances in amplitude, and instead more sensitive to frequency errors. Depending on the interference situation, frequency or amplitude may be preferable for representing the information in a signal. In most cases, however, amplitude may be a more vulnerable quantity, especially in case of intermittent interference caused by that different interferers, may turn on and off their transmissions and then cause variations in DC-offset and gain in the front-end of the radio as well as varying additional power being detected by an amplitude detector. Frequency detection is less sensitive to such interference, making FSK preferable in most high interference situations. When possible to use, however, the OOK will be simpler and should hence enable the lowest power consumption.

The fact that there are two ways of implementing WUR may result in that different standards simply select to use different modulations. For example, standard A may use OOK whereas standard B may use FSK. A device supporting both standard A and standard B may therefore have to implement two WUR architectures. Since the analog part of a device is typically dominating the silicon area, this is much more costly than if the same modulation would be used, but with different coding and symbol rates that easily could be supported by digital baseband.

Another disadvantage is that whether OOK or FSK is the preferred modulation may depend on things like requirements on sensitivity and selectivity. A device may e.g. experience very different receiver condition depending on whether the device is close or far from a transmitter.

As yet another potential issue, it may be so that whether OOK or FSK is the preferred modulation may depend on choice of receiver architecture. This means that when selecting one or the other modulation, the decision may primarily be based on some company's current product implementation, implying that other companies may not be able to take advantage of their product architecture in a similar manner.

SUMMARY

It is therefore an object of embodiments herein to provide an improved method and apparatus for transmitting a signal to a receiver in a wireless communication system.

According to a first aspect of embodiments herein, the object is achieved by a method performed in a transmitter for transmitting a signal to a receiver in a wireless communication system. The transmitter modulates a signal using two different modulations, a combination of binary amplitude shift keying (ASK) and binary frequency shift keying (FSK). The transmitter then transmits the modulated signal.

According to a second aspect of embodiments herein, the object is achieved by a transmitter for transmitting a signal to a receiver in a wireless communication system. The transmitter is configured to modulate a signal using two different modulations, a combination of binary amplitude shift keying (ASK) and binary frequency shift keying (FSK). The transmitter is further configured to transmit the modulated signal.

In other words, according to the embodiments herein, a signal, e.g. a wake-up signal, is modulated using both FSK and OOK and is transmitted so that information in the signal may be extracted both by a receiver, e.g. a WUR, implemented with an FSK demodulator and a receiver with an OOK demodulator. In this way one may select what type of demodulator to implement in a WUR.

In deployments where it may vary which type of demodulator is the best one, it may be possible for a device which has implemented both types of modulators to switch between the two depending on instantaneous conditions and select the one that provides the best performance.

The embodiment herein allows for supporting two types of fundamentally different receiver architectures to be used for receiving the same wake-up signal, increasing the flexibility for the receiver design.

The embodiment herein also allows for multiplexing of two signals, where the two signals are intended for receivers using different demodulators. In this case, the embodiment herein allows for a more spectrum efficient use of wake-up receivers since a single wake-up packet may be used to wake two different systems, rather than having to send two packets for the same purpose.

In case a receiver supports both modulations, it may also be possible to increase the total data rate by making use of both modulations.

Therefore, the embodiments herein provide an improved method and apparatus for transmitting a signal to a receiver in a wireless communication system.

BRIEF DESCRIPTION OF THE DRAWINGS

Examples of embodiments herein are described in more detail with reference to attached drawings in which.

DETAILED DESCRIPTION

As part of developing embodiments herein, individual modulations and the corresponding receivers for demodulating the respective modulations will first be discussed.

FSK: Modulation and Demodulation

An FSK signal carries information in the instantaneous frequency of the signal. Binary FSK which is the most promising alternative for a WUS based on FSK, is considered here, since the amount of information is limited and thus there is no need to use a large modulation alphabet.

One may without loss of generality assume that a logical one is transmitted using a positive frequency offset whereas a logical zero is transmitted using a negative frequency offset, where the offset here refers to the frequency offset compared to a carrier frequency.

Figure 1:
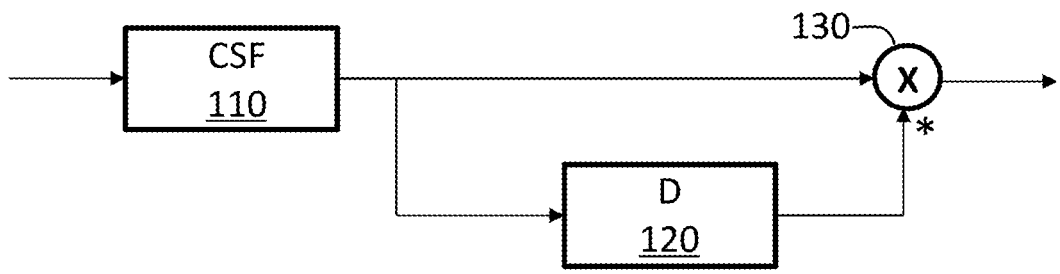
FIG. 1 is a schematic block diagram showing an FSK demodulator according to prior art.

There are different means to demodulate an FSK signal. One way may be to estimate the instantaneous frequency directly by essentially differentiating the FSK signal and in this way estimating whether a phase change is positive or negative. This is referred to as non-coherent reception. FIG. 1 illustrates such a FSK demodulator, including a channel selective filter CSF 110 to remove adjacent channel interference, a delay unit D 120 to delay a signal and a multiplier X 130 to multiply a signal with a complex conjugate of a delayed version of the signal. Differentiating a signal is done by multiplying the signal with the complex conjugate of the delayed version of the signal and then considering resulting imaginary part in order to estimate whether a frequency deviation is positive or negative.

Since a derivative or difference between two signals typically will be noisier than the signal itself, one may try to enhance the performance of a demodulator by directly estimating whether a frequency offset is positive or negative by considering the instantaneous phase of a signal. For this to become feasible, one needs to have a phase reference which typically means that the receiver becomes more complex. In case the demodulation is based on using a phase reference, it is referred to as a coherent receiver.

Figure 2:
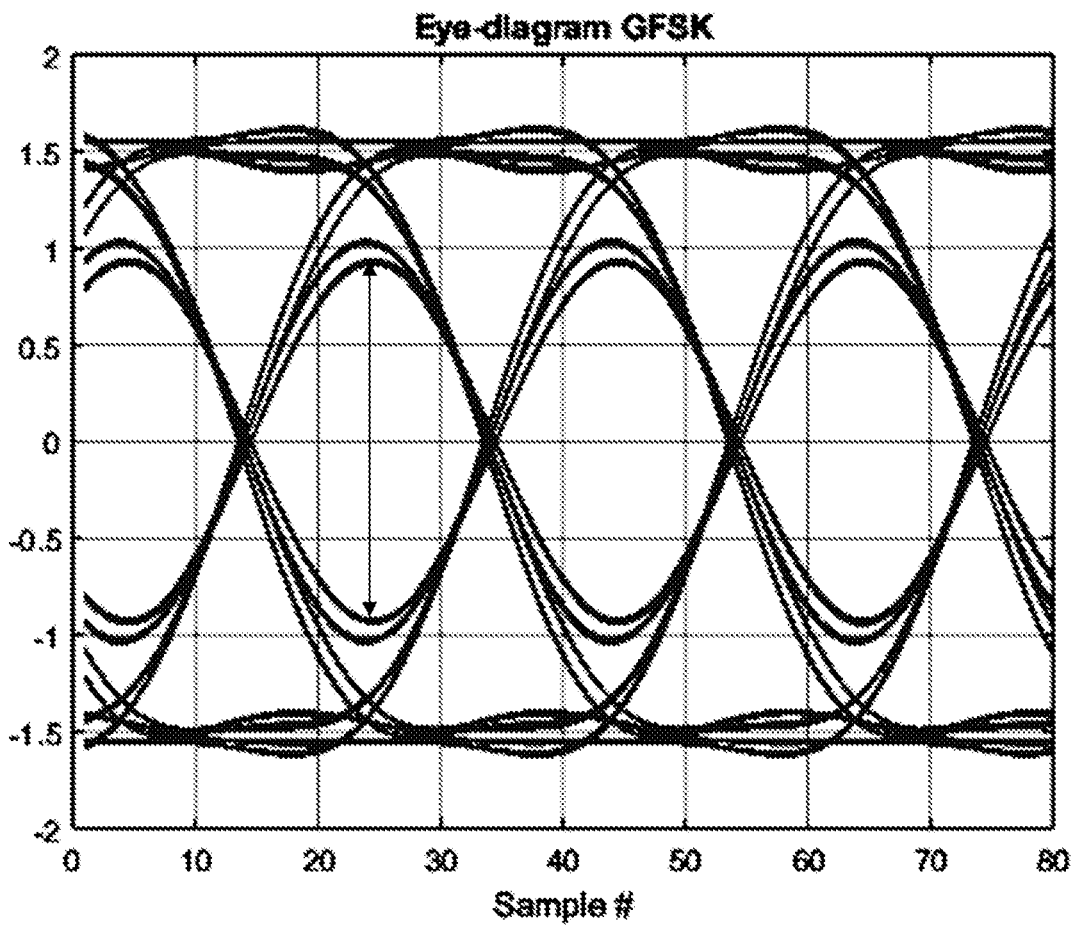
FIG. 2 is an eye-diagram for a receiver with an FSK demodulator shown in FIG. 1.

When a receiver uses a demodulator as shown in FIG. 1 to demodulate an FSK signal, one may obtain a good understanding for how well the receiver will work by considering the so-called eye-diagram. An example of an eye-diagram for a Gaussian FSK (GFSK) signal is shown in FIG. 2. The GFSK is used in a Bluetooth Low Energy (BLE) communication network. In this figure, the sampling rate is 20 MHz and the data rate is 1 Mb/s which means that the distance between the eye-openings is 20 samples. Referring to FIG. 2, it is readily seen that an optimum time for making a decision is when the eye-opening is as large as possible, i.e., at sample instants 6, 26, 46, . . . .

OOK/ASK: Modulation and Demodulation

An OOK signal carries information in the amplitude of the signal, and in its simplest form this means that a logical one is transmitted by sending a signal with amplitude greater than zero, whereas a logical zero is represented by an absence of a signal. In a more general form, information may be transmitted by using a signal with two different amplitudes where both amplitudes are greater than zero, and this is referred to as Amplitude Shift keying (ASK).

Figure 3:
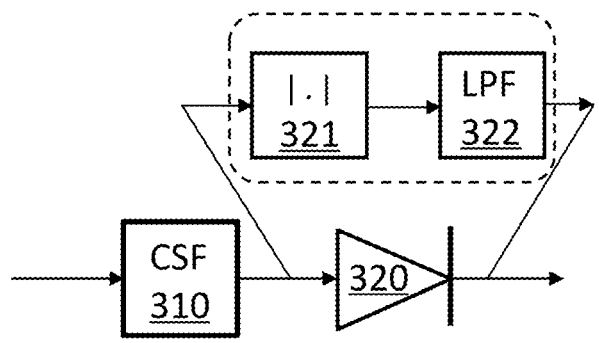
FIG. 3 is a schematic block diagram showing an OOK/ASK demodulator according to prior art.

FIG. 3 Illustrates an ASK demodulator, including a channel selective filter CSF 310 to remove adjacent channel interference and an envelope detector 320. The envelope detector 320 may comprise a rectifying circuit 321 and a low-pass filter LPF 322.

Figure 4:
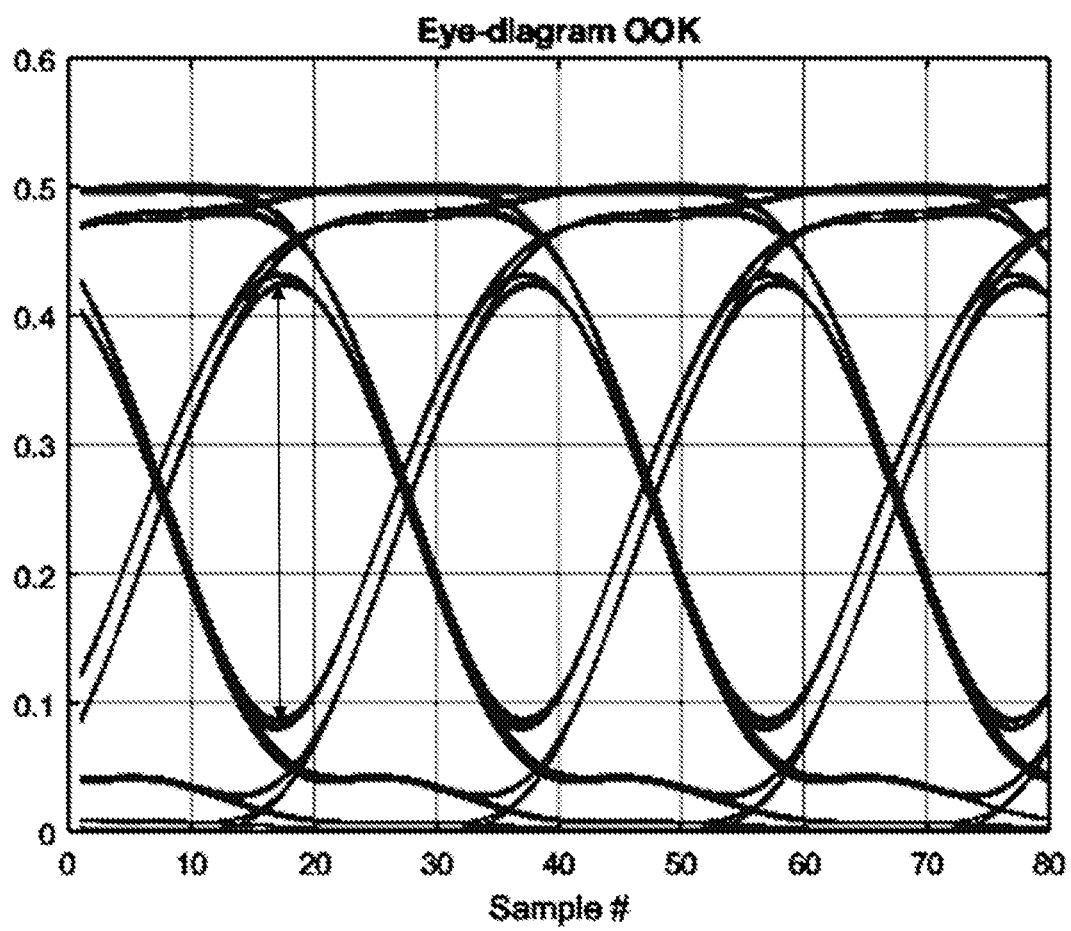
FIG. 4 is an eye-diagram for a receiver with OOK demodulator shown in FIG. 3.

Similar to the case of a FSK receiver, one can obtain a good feeling for the performance of an ASK/OOK receiver by considering its eye-diagram. An example of an eye-diagram for an OOK signal is shown in FIG. 4. Similar to the eye-diagram shown in FIG. 2, the sampling rate is 20 MHz and the bit rate is 1 Mb/s. As can be seen, the shapes of the two eye-diagrams are somewhat similar although not identical.

Figure 5:
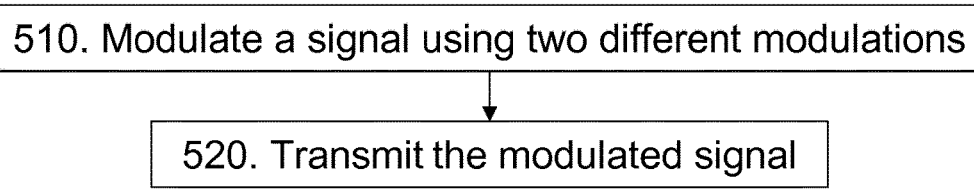
FIG. 5 is a flow chart illustrating a method according to embodiments herein.

Having briefly discussed FSK and ASK/OOK demodulation of the corresponding modulations, a method performed in a transmitter for transmitting a signal to a receiver in a wireless communication system according to the embodiments herein will now be described with reference to FIG. 5. The method comprises the following actions or steps.

Action 510

The transmitter modulates a signal using two different modulations, a combination of binary amplitude shift keying (ASK) and binary frequency shift keying (FSK), based on logical one or zero of a data stream.

For example, modulating a signal using two different modulations may be performed by shifting frequency of the signal with a frequency offset and shifting amplitude of the signal with an amplitude offset based on logical one or zero of the information data stream.

Action 520

The transmitter transmits the modulated signal.

In the following, modulating a signal using the two different modulations ASK and FSK will be described in detail with some examples.

Figure 6:
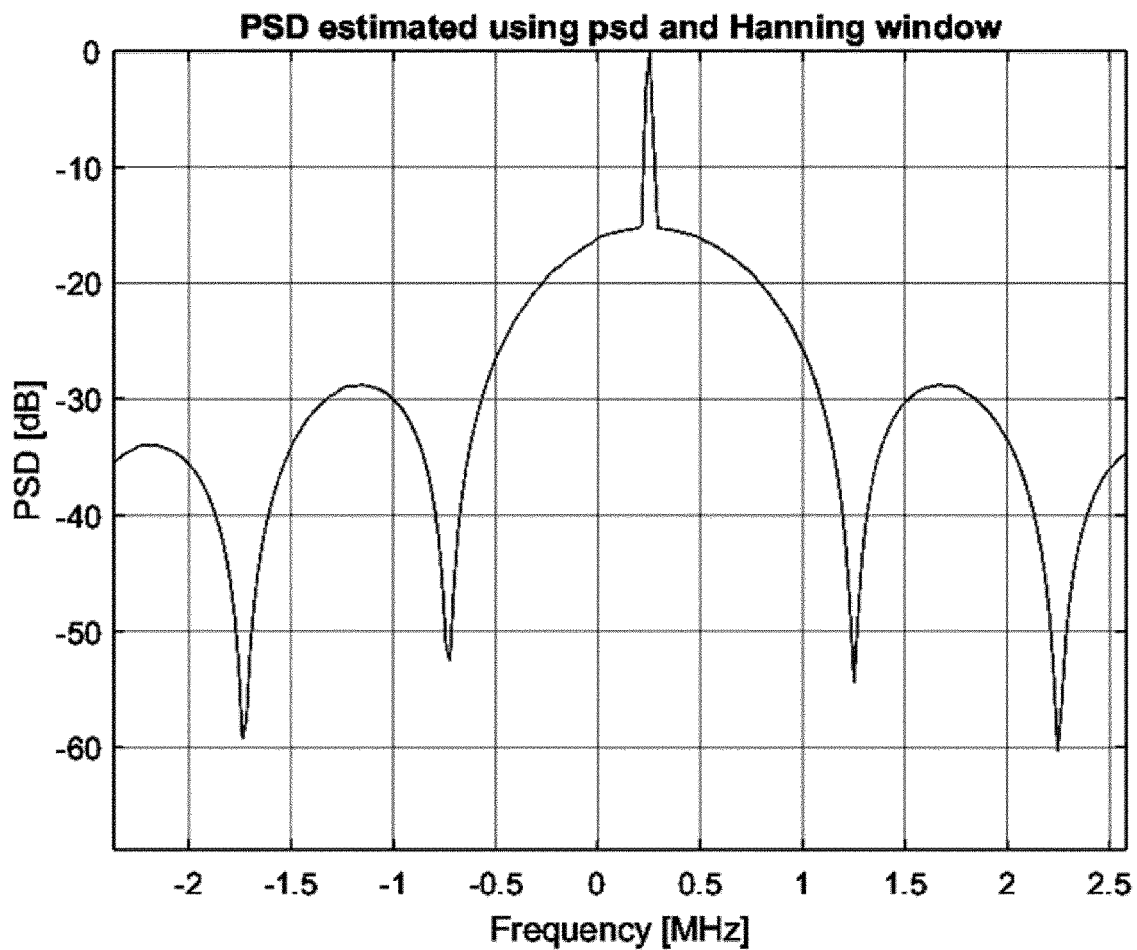
FIG. 6 is a diagram illustrating PSD for a GFSK signal when OOK/ASK is applied to it according to embodiments herein.

Since ASK and OOK in principle may be generated based on any waveform, one may in particular choose to apply ASK/OOK modulation to a GFSK signal with e.g. the same parameters that is used in the BLE standard. The power spectral density (PSD) for such a signal is shown in FIG. 6. As can be seen, since the transmitted signal is a sinusoid signal with a 250 kHz frequency offset that is modulated using OOK, the PSD will show a distinct peak at 250 kHz.

Figure 7:
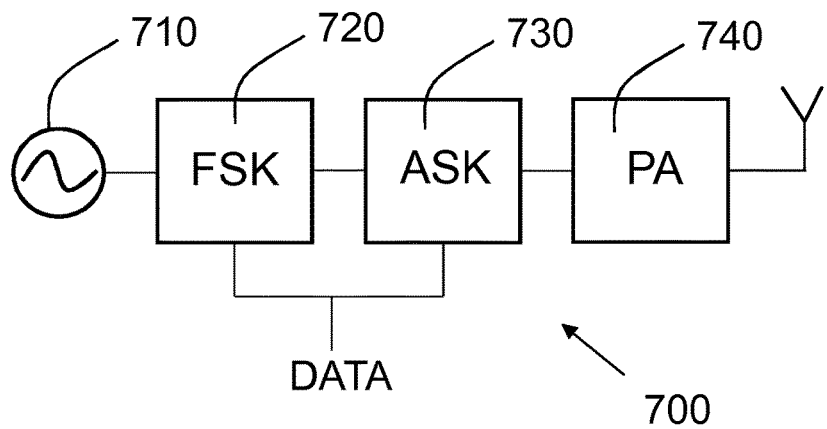
FIG. 7 is a schematic block diagram showing a transmitter with a dual-modulation modulator according to embodiments herein.

According to some embodiments herein, same information may be modulated and transmitted using both FSK and ASK, i.e. the signal is modulated using both FSK and ASK with one data stream in binary representing the same information. FIG. 7 shows a transmitter 700 comprising a dual-modulation modulator, i.e. an FSK modulator FSK 720 and an ASK modulator ASK 730. The transmitter 700 is configured to modulate a signal using two different modulations, a combination of binary ASK and binary FSK based on logical one or zero of an information data stream and transmit the modulated signal. As shown in FIG. 7, a signal may be generated from a signal generator 710 and is modulated by both FSK and ASK modulators with the same data stream DATA. As an example of the dual-modulation according to this embodiment, one may start with generating a BLE signal with frequency deviations of +/−250 kHz, but let the BLE signal with the negative frequency offset be modulated with half of the signal amplitude. In this way, a data with logical zero may be represented with a negative frequency offset if viewed as FSK and with lower amplitude if viewed as ASK. The transmitter 700 may further comprise a power amplifier PA 740 to amplify the modulated signal or the PA 740 may be combined with the ASK 730.

Figure 8:
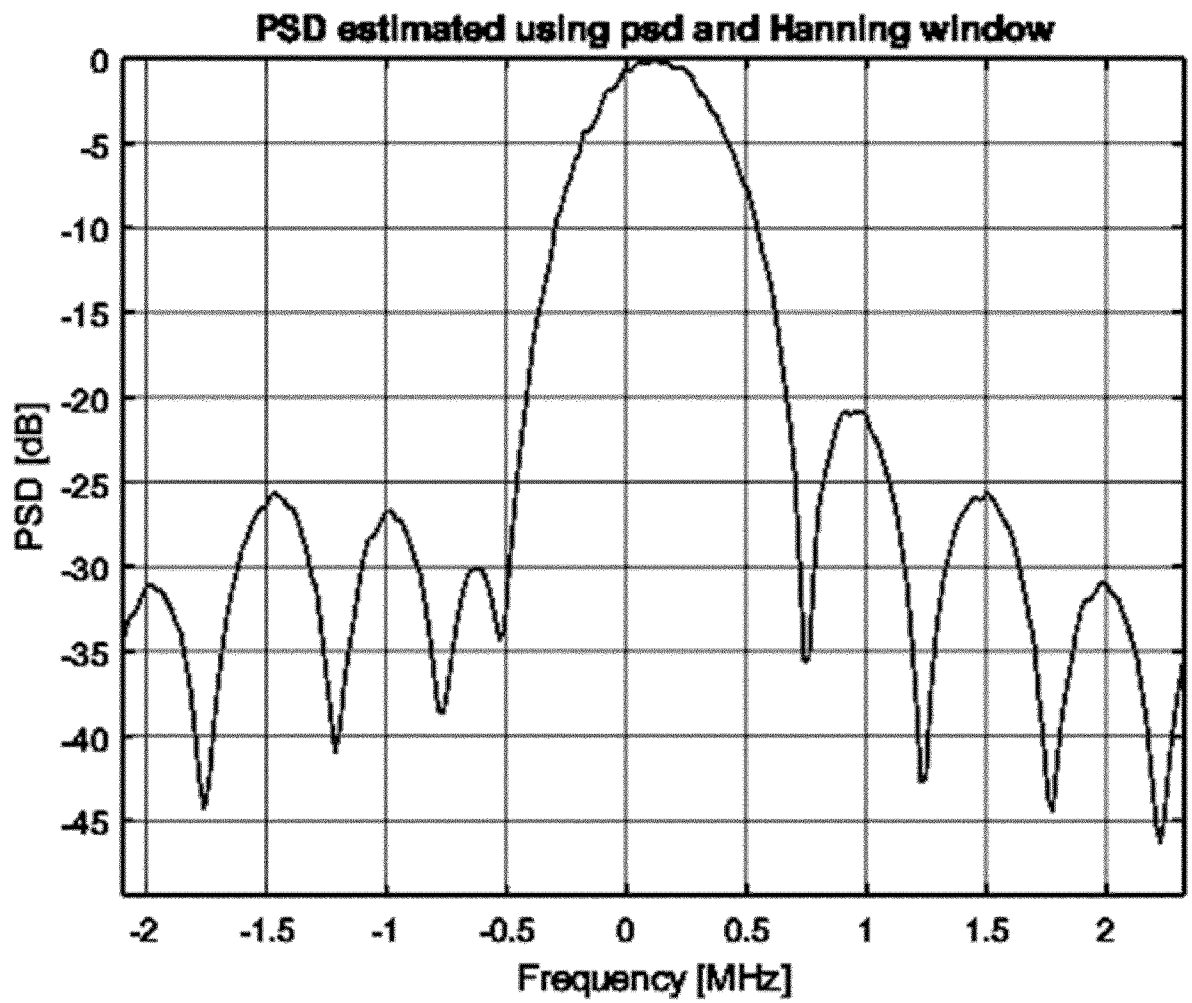
FIG. 8 is a diagram illustrating PSD for a signal modulated using dual-modulation according to embodiments herein.

The PSD of the dual-modulation signal will no longer contain a discrete component, as shown in FIG. 8. Since the positive frequency offset is used with a higher power, the PSD will be shifted towards the positive frequency offset compared to a BLE signal with only GFSK. The removal or suppression of discrete frequency components from the PSD is a desirable side effect from dual-modulation, because in some regulatory domains there are limits on the amount of power transmitted in a narrow band. For example, according to the Federal Communications Commission Part 15.247, "for digitally modulated systems, the power spectral density conducted from the intentional radiator to the antenna shall not be greater than 8 dBm in any 3 kHz band during any time interval of continuous transmission".

Figure 9:
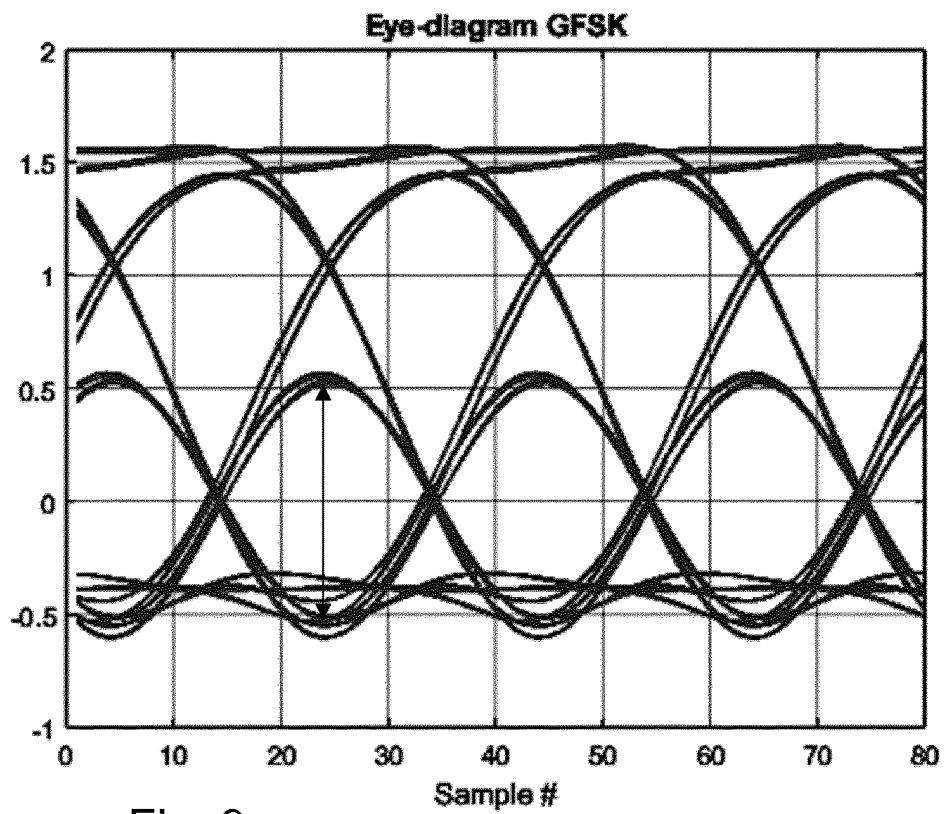
FIG. 9 is an eye-diagram for an FSK receiver when receiving a dual-modulation signal according to embodiments herein.
Figure 10:
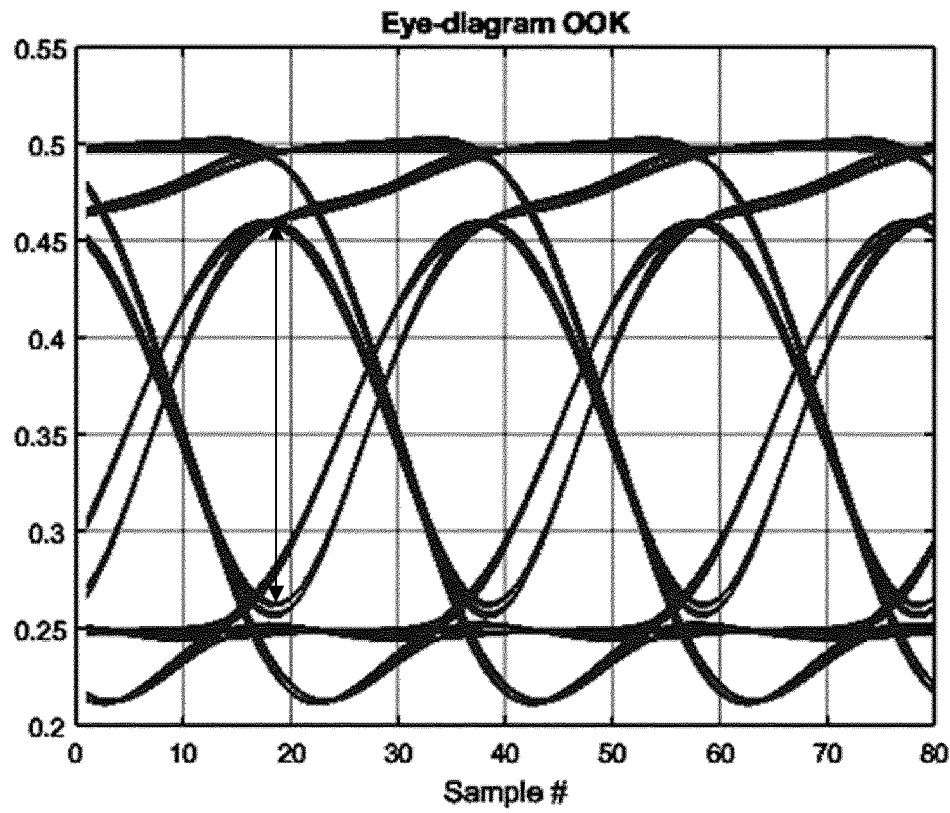
FIG. 10 is an eye-diagram for an OOK/ASK receiver when receiving a dual-modulation signal according to embodiments herein.

Applying this form of dual-modulation and then using the receivers with FSK and OOK demodulators as described in the previous sections to demodulate the dual-modulation signal, one obtains eye-diagrams shown in FIG. 9 and FIG. 10, respectively. Referring to the eye-diagram in FIG. 9, the different powers used for the positive and negative offset are clearly seen from the amplitudes of the signal by looking at the y-axis, the maximum positive frequency estimated by the detector is much larger than the negative. This is because in the differentiation, the amplitude has an impact. Furthermore, comparing the eye-openings with the maximum and minimum frequencies to that of a pure GFSK signal, it is apparent that the eye-opening is reduced, although still clearly seen. The eye-opening found in the OOK receiver shown in FIG. 10 is still quite open. What should be taken into account in this case, however, is that the absolute eye-opening is reduced since OFF, i.e. no signal or the signal amplitude is zero, has been replaced by just reducing the signal amplitude by a factor of two.

The fact that the eye-diagram for the FSK receiver is very asymmetric is due to that differentiating the signal is done by multiplexing the signal with a complex conjugate of a delayed version of the signal and then consider the resulting imaginary part in order to estimate the whether the frequency deviation was positive or negative.

Figure 11:
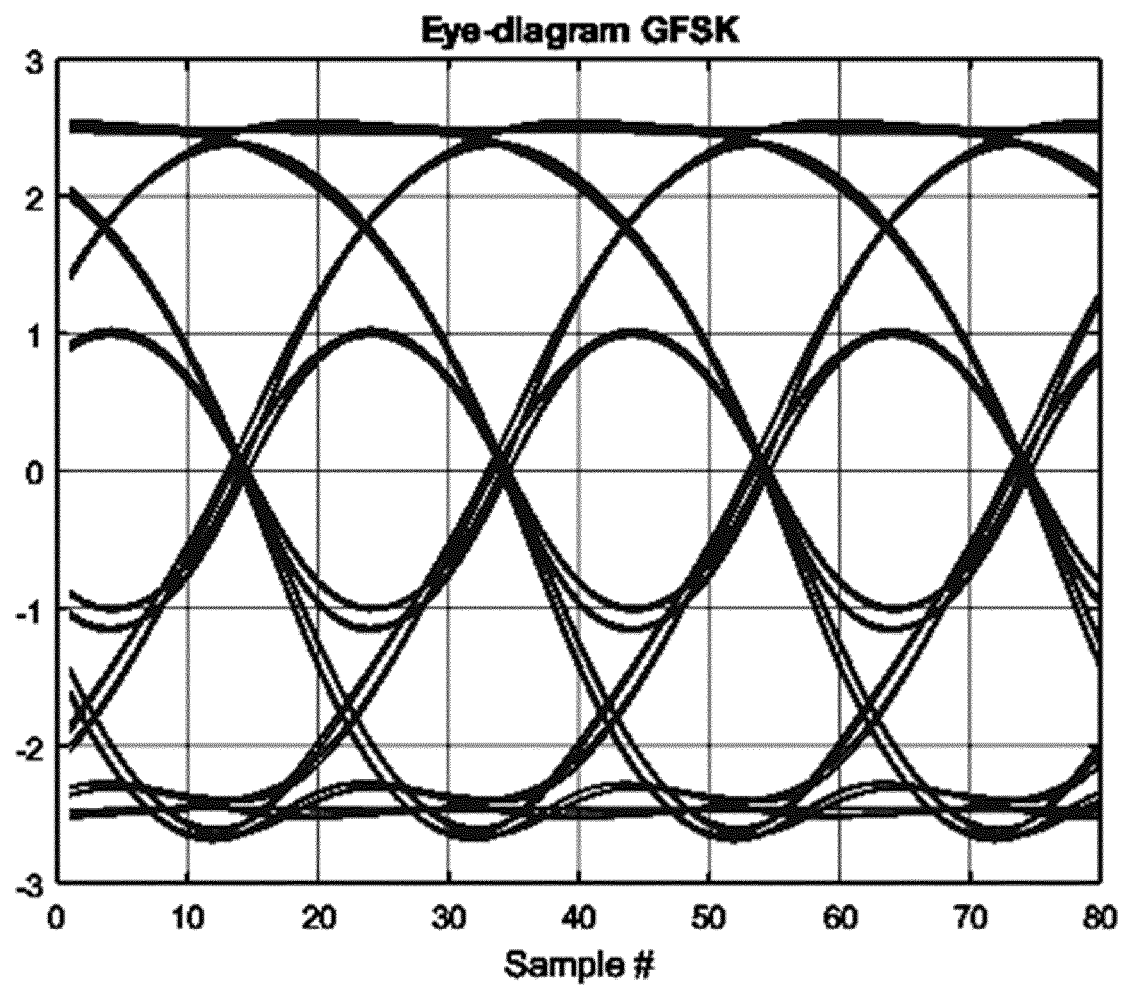
FIG. 11 is an eye-diagram for an FSK receiver operating in phase domain when receiving a dual-modulation signal according to embodiments herein.

Since the purpose of the demodulator is to determine whether the phase shift is positive or negative, one may in an alternative implementation consider the phase directly, i.e., the differentiation is performed by subtracting the phase from the delayed signal with the phase of the present signal. In this way the amplitude of the signal will not be seen in the eye-diagram. The eye diagram for a receiver that is operating on the phase directly is shown in FIG. 11. The eye-diagram in FIG. 11 may give an impression that if one let the receiver operate in the phase domain, there is essentially no cost associated with adding ASK on top of an FSK signal. This is, however, not the case since the signal sent with lower amplitude will be more susceptible to noise.

Figure 12:
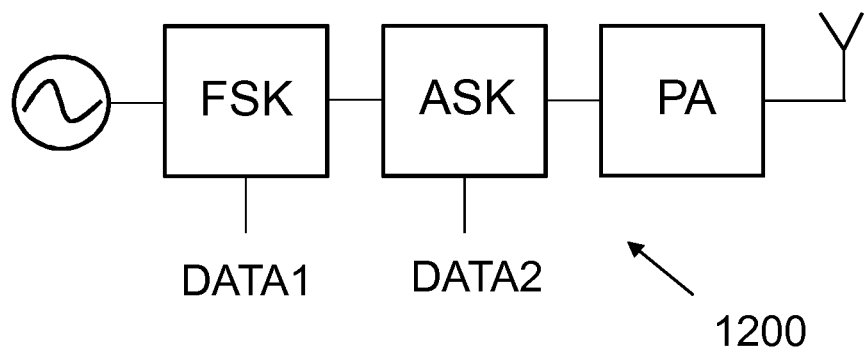
FIG. 12 is a schematic block diagram showing a transmitter with a dual-modulation modulator with independent data according to embodiments herein.

The previous embodiment targets the situation that the same information may be transmitted using both FSK and ASK. It is also possible to transmit different information using FSK and ASK, i.e. the signal may be modulated with two data streams representing different information. FIG. 12 shows such a transmitter 1200 according to some embodiments herein, where a signal is modulated with FSK based on a first data stream DATA1 and is modulated with ASK based on a second data stream DATA2. One may view it as the signal is modulated twice in a consecutive fashion.

Figure 13:
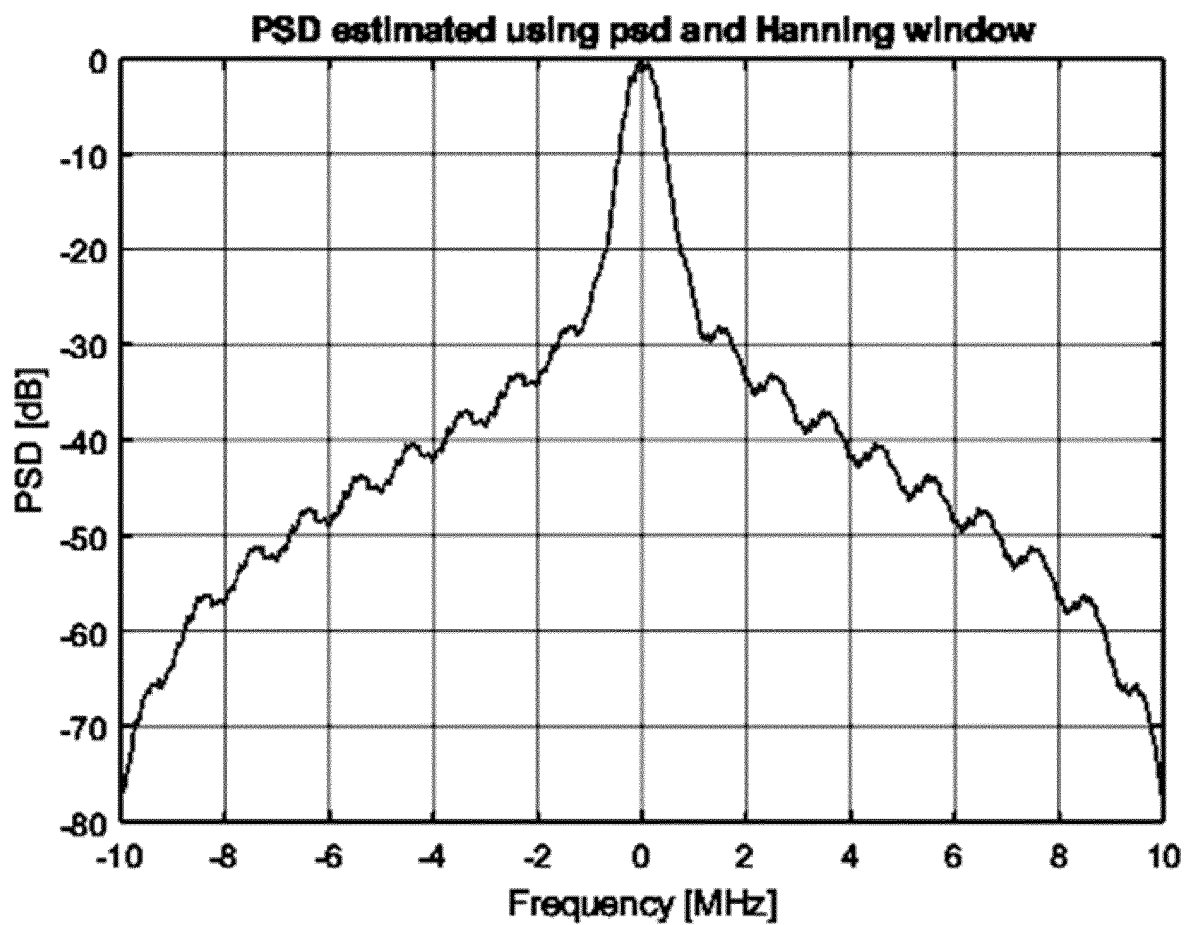
FIG. 13 is a diagram illustrating PSD for a signal modulated using dual modulation with independent data according to embodiments herein.
Figure 14:
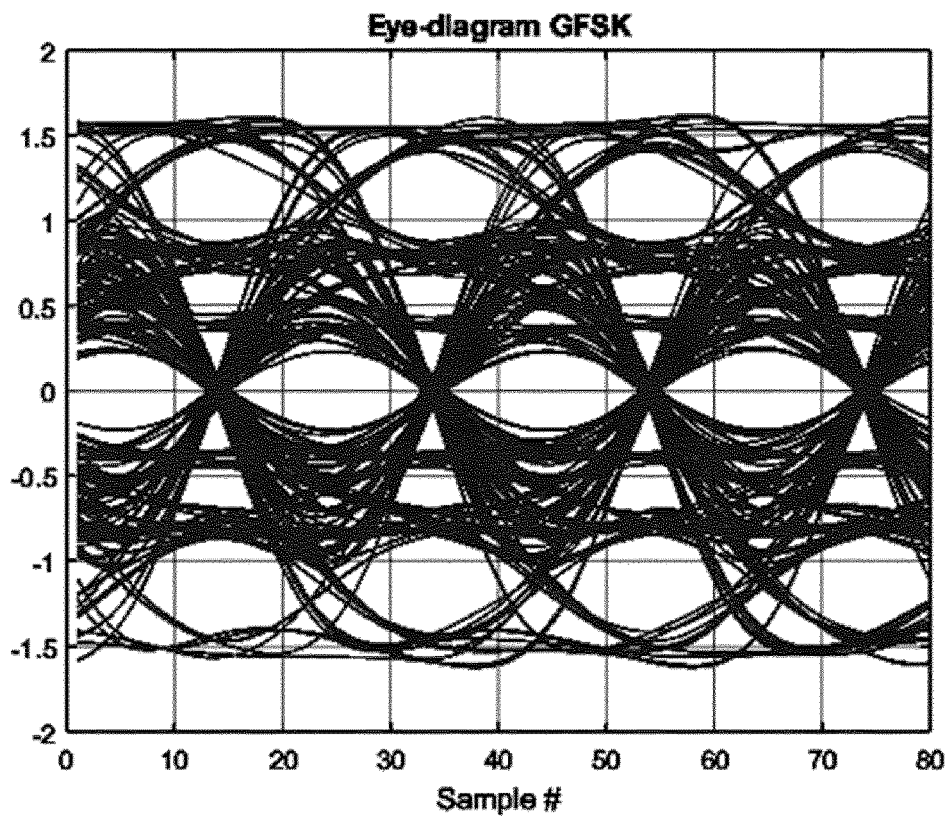
FIG. 14 is an eye-diagram for a FSK receiver when receiving a dual-modulation signal with independent data according to embodiments herein.
Figure 15:
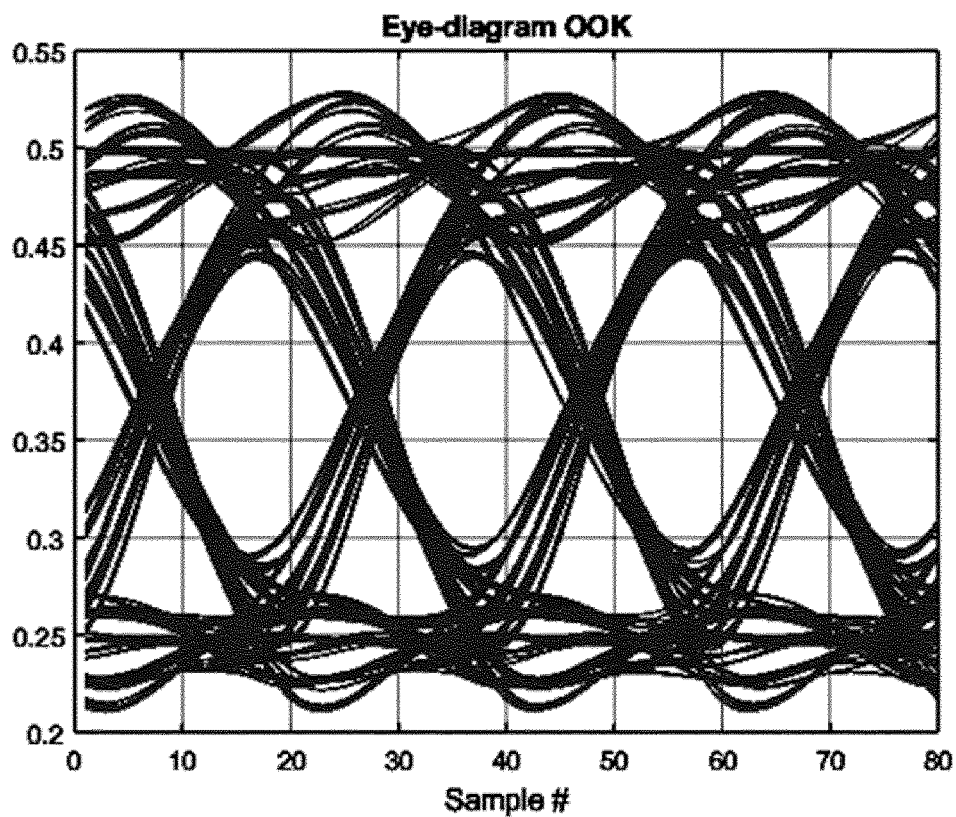
FIG. 15 is an eye-diagram for a OOK/ASK receiver when receiving a dual-modulation signal with independent data according to embodiments herein.

According to some embodiments herein, the modulations for the two data streams may be done at the same data rate. This is probably also the most favorable situation for the reception of the signal. FIG. 13 shows the PSD for a signal modulated using dual-modulation with independent data. FIG. 14 shows an eye-diagram for an FSK receiver when receiving the dual-modulation signal with independent data. FIG. 15 shows the eye-diagram for an OOK receiver when receiving the dual-modulation signal with independent data.

Because the two data streams are independent, the PSD will be symmetric as shown in FIG. 13. Concerning the eye-diagram for the FSK receiver, as shown in FIG. 14, it can be noted that the lower amplitude will now affect both the negative and frequency offsets and thus effectively closing the eye from both directions. Consequently, the performance of the FSK receiver may be expected to be significantly negatively impacted in case the two data streams are independent rather than identical for the two modulations.

Finally, considering the eye-diagram for the OOK receiver, it can be seen that the eye-opening is largely the same as the one when receiving the dual-modulation signal with identical data. Since the information is in the envelope of a signal, it does not really matter.

According to some embodiments herein, bitrates may be different for the two data streams transmitted using FSK and OOK. One may, for instance, transmit the FSK signal at 1 Mb/s and the ASK signal at 500 kb/s, or vice versa.

One particular situation when it may be desirable to use different data rates for the two modulations is if one of them is applying Manchester coding. That is, the information in any one or both of the data streams may be represented by a Manchester code. When Manchester coding is applied, the information is not directly sent in e.g. the frequency or amplitude of a signal, but instead the information is represented by how the signal changes. In case of FSK, Manchester coding may be implemented such that a logical zero may be represented by a positive frequency offset followed by a negative frequency offset, whereas a logical one would be represented by a negative frequency offset followed by a positive frequency offset. The advantage with applying Manchester coding in this case is that there is no need to estimate the center frequency, since the demodulator will not make a decision on the absolute frequency deviation but rather on how the frequency deviation changes.

In case of OOK, Manchester coding works in an analogous matter. A logical zero is not represented by OFF, but instead of ON-OFF, and a logical one is represented by OFF-ON instead of just ON.

Now consider when FSK and OOK are used for dual-modulation. If Manchester coding is applied to OOK and we let the data rate for FSK be twice as high as for OOK, each FSK symbol will contain exactly one ON and one OFF part, and thus when the FSK signal is demodulated both frequencies will effectively be received with the same total power.

According to some embodiments herein, modulating a signal using two different modulations may be performed by staggering the two modulations in time such that the signal is modulated with FSK during one period of time and modulated with ASK during another period of time.

For example, suppose that an FSK signal is generated and that it is known that the signal will be demodulated by considering the phase of the signal at certain points in time, but in between these points the receiver does not really use the information of the signal. One may then modulate the signal using ASK during that part of time when the signal will not be used by the FSK receiver. This kind of dual-modulation may be referred as interleaved modulations.

According to some embodiments herein, one possibility may be to use pulse width modulation (PWM), with pulses centered around the points in time where the phase is observed by a receiver. The bandwidth of the CSF in a receiver may then be wide enough so that also the shortest pulses reach near full amplitude when sampling the phase of the signal. Then there will be no degradation of the FSK signal detection. The ASK may be implemented by means of PWM, i.e. using different pulse widths, so that low amplitude is represented by using narrow or short pulses, and large amplitude by wide or long pulses. In OOK, full amplitude may be represented by continuous transmission, i.e. the pulses are so wide that the signal is ON 100% of the time during full OOK amplitude. During OOK reception, the bandwidth of the filters do not need to be increased due to the signal properties of the interleaved modulations, but may be set only regarding frequency accuracy.

Figure 16:
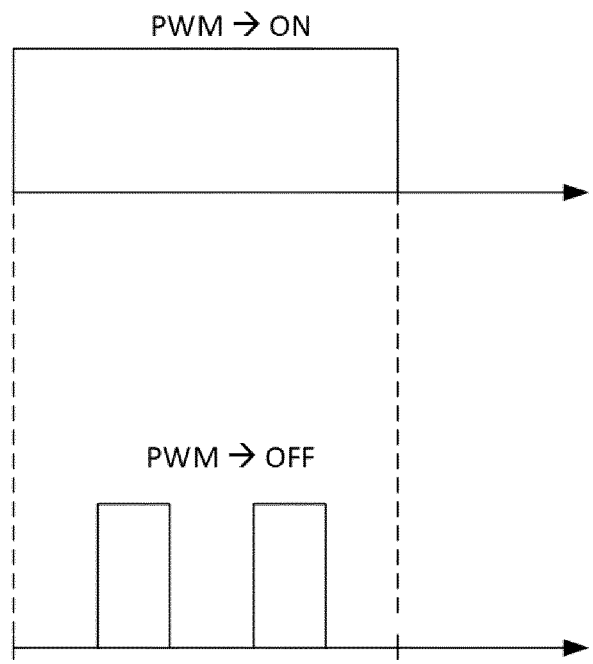
FIG. 16 is a diagram illustrating an example of PWM according to embodiments herein.

For certain receiver architectures, it may be necessary to use a CSF that is relatively wide in order to allow for very relaxed requirements on frequency generation. When this is the case, the performance for in particular an FSK receiver will be worse at the expense of the reduced power consumption achieved by the relaxed requirements on the frequency generation. However, if the CSF anyway is wide, one may make use of this in generation of the ASK/OOK signal. Specifically, an ON signal may be represented by a wider pulse width, whereas an OFF signal may be represented by a narrower pulse width. Since an ASK/OOK receiver contains a LPF which is matched to the bitrate, exactly how the PWM is done will typically not matter. An example is shown in FIG. 16, where ON is represented by one wide pulse, while OFF is represented by two narrow pulses. If, for instance, the pulse in fact consists of two or more pulses, it does not matter as long as bandwidth of the signal fits within the bandwidth of the CSF.

PWM is applicable irrespective of whether the data modulated with FSK and ASK are different or identical as described in the two corresponding embodiments.

The description of the different embodiments has been made to emphasize the feasibility of modulating a signal using two different modulations, and still be able to extract the information using a standard receiver only taking one of the modulations into account. Based on these illustrative examples, it should be clear that the cost of dual-modulation is the performance, which has been illustrated above by considering the eye-diagrams. This performance loss will now be addressed in some more details and in particular what can be done to reduce the negative impact it may have. Typically, there is trade-off associated with dual-modulation in the sense that the performance of one of the modulation may be improved at the expense of the other one. This trade-off is present, possibly to a varying degree, irrespective of whether the same information or data is using both modulations or if independent information or data are transmitted using the two modulations.

To describe what may impact the choice of parameters, suppose the dual-modulation is achieved as illustrated in one of the examples, i.e., a logical zero is represented by a negative frequency offset and transmitted at reduced amplitude of what is used to for a logical one, which is represented by a positive frequency offset.

The trade-off here is as follows. If the amplitude is only reduced a little, the dual-modulation signal will be similar to an FSK signal and then the performance for an FSK receiver will be very good whereas the performance for an ASK receiver will be poor. On the contrary, if the amplitude offset is large, the dual-modulation signal will be similar to an OOK signal and the performance will be good for an OOK receiver, but poor for a FSK receiver.

One way to explore this is when the transmitter roughly knows the receiver conditions for different devices and whether they use FSK or ASK. If FSK receivers are far away from a transmitter and have relatively poor receiver conditions, while ASK receivers are relatively close to the transmitter, then the transmitter may select to use a relatively small amplitude offset in order to aid the FSK receivers. In case the ASK receivers are far away, the amplitude offset may instead be increased to aid the ASK receivers.

Therefore according to some embodiments herein, when modulating a signal using two different modulations, a frequency offset for FSK modulation and an amplitude offset of two amplitudes used for ASK modulation may be selected based on receiver conditions.

Figure 17:
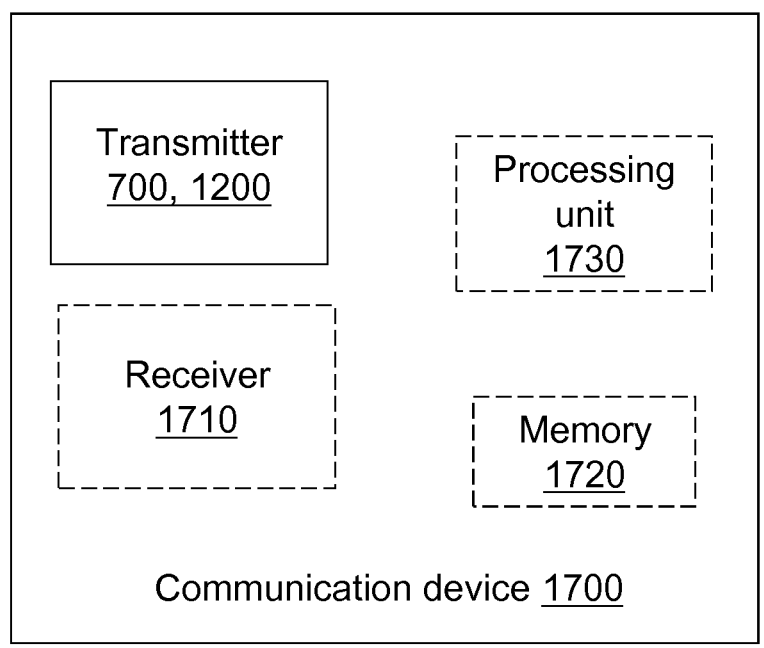
FIG. 17 is a schematic block diagram illustrating embodiments of a communication device in which embodiments herein may be implemented.

The transmitter 700, 1200 according to the embodiments herein may be employed in various communication devices or apparatus. FIG. 17 shows a block diagram for a communication device 1700. The communication device 1700 comprises a transmitter 700, 1200 according to the embodiments herein. The communication device 1700 may further comprise other units, where a receiver 1710, a memory unit 1720 and a processing unit 1730 are shown. The communication device 1700 may be a radio base station, a user equipment or a mobile device, a Wi-Fi access point, a Wi-Fi station, a Bluetooth Low Energy device etc. for a wireless communication system.

To summarize, the embodiments herein provide an improved method and apparatus for transmitting a signal to a receiver in a wireless communication system. A signal, e.g. a wake-up signal, is modulated using both FSK and ASK/OOK and is transmitted so that information in the signal may be extracted both by a receiver implemented with an FSK demodulator and a receiver with an OOK demodulator.

The embodiment herein allows for a device which has implemented both types of modulators to switch between the two depending on instantaneous conditions and select the one that provides the best performance.

The embodiment herein allows for supporting two types of fundamentally different receiver architectures to be used for receiving the same wake-up signal, increasing the flexibility for the receiver design.

The embodiment herein also allows for multiplexing of two signals, where the two signals are intended for receivers using different demodulators. In this case the embodiment herein allows for a more spectrum efficient use of wake-up receivers since a single wake-up packet may be used to wake two different systems, rather than having to send two packets for the same purpose.

In case a receiver supports both modulations, it may also be possible to increase the total data rate by making use of both modulations.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method performed in a transmitter for transmitting a signal to a receiver in a wireless communication system, the method comprising:
    modulating the signal with a first data stream at a first data rate using binary frequency shift keying (FSK) modulation to generate an FSK modulated signal, and further modulating the FSK modulated signal with a second data stream at a second data rate using binary amplitude shift keying (ASK) modulation to generate an FSK and ASK modulated signal, the ASK modulation including Manchester coding, and the first data rate being greater than the second data rate to enable demodulation of two frequencies of the FSK modulation at equal power; and
    transmitting the FSK and ASK modulated signal.

2. The method according to claim 1, wherein modulating the signal using the FSK modulation includes shifting a frequency of the signal with a frequency offset, and modulating the FSK modulated signal using the ASK modulation includes shifting an amplitude of the FSK modulated signal with an amplitude offset.

3. The method according to claim 1, wherein modulating the signal using ASK and FSK modulations is performed by staggering the ASK modulation and the FSK modulation in time such that the signal is modulated using the FSK modulation during one period of time and modulated using the ASK modulation during another period of time.

4. The method according to claim 1, wherein the first data stream and the second data stream represent identical information.

5. The method according to claim 1, the first data stream and the second data stream represent different information.

6. The method according to claim 5, wherein bitrates of the first data stream and the second data stream are different.

7. The method according to claim 1, wherein the ASK modulation is implemented using pulse width modulation (PWM).

8. The method according to claim 1, wherein the ASK is On-Off Keying (OOK).

9. The method according to claim 1, further comprising selecting a frequency offset for the FSK modulation and an amplitude offset for the ASK modulation based on receiver conditions.

10. A transmitter for transmitting a signal to a receiver in a wireless communication system, the transmitter comprising circuitry configured to:
    modulate the signal with a first data stream at a first data rate using binary frequency shift keying (FSK) modulation to generate an FSK modulated signal and further modulate the FSK modulated signal with a second data stream at a second data rate using binary amplitude shift keying (ASK) modulation to generate an FSK and ASK modulated signal, the ASK modulation including Manchester coding, and the first data rate being greater than the second data rate to enable demodulation of two frequencies of the FSK modulation at equal power; and transmit the FSK and ASK modulated signal.

11. The transmitter according to claim 10, wherein the transmitter is configured to modulate the signal using the FSK modulation by shifting a frequency of the signal with a frequency offset, and to modulate the FSK modulated signal using the ASK modulation by shifting an amplitude of the FSK modulated signal with an amplitude offset.

12. The transmitter according to claim 10, wherein the transmitter is configured to modulate the signal using the ASK and FSK modulations by staggering the ASK modulation and the FSK modulation in time such that the signal is modulated using the FSK modulation during one period of time and modulated using the ASK modulation during another period of time.

13. The transmitter according to claim 10, wherein the first data stream and the second data stream represent identical information.

14. The transmitter according to claim 10, wherein the first data stream and the second data stream represent different information.

15. The transmitter according to claim 14, wherein bitrates of the first data stream and the second data stream are different.

16. The transmitter according to claim 10, wherein the ASK modulation is implemented using pulse width modulation (PWM).

17. The transmitter according to claim 10, wherein the ASK is On-Off Keying (OOK).

18. The transmitter according to claim 10, wherein the transmitter is further configured to select a frequency offset for the FSK modulation and an amplitude offset for the ASK modulation based on receiver conditions.

19. A communication device, comprising:
a transmitter for transmitting a signal to a receiver in a wireless communication system, the transmitter being configured to:
modulate the signal with a first data stream at a first data rate using binary frequency shift keying (FSK) modulation to generate an FSK modulated signal and further modulate the FSK modulated signal with a second data stream at a second data rate using binary amplitude shift keying (ASK) modulation to generate an FSK and ASK modulated signal, the ASK modulation including Manchester coding, and the first data rate being greater than the second data rate to enable demodulation of two frequencies of the FSK modulation at equal power; and
transmit the FSK AND ASK modulated signal.

* * * * *